Nov. 9, 1926.
C. LANGHAM
1,606,584
TIRE SIGNAL
Filed March 3, 1926
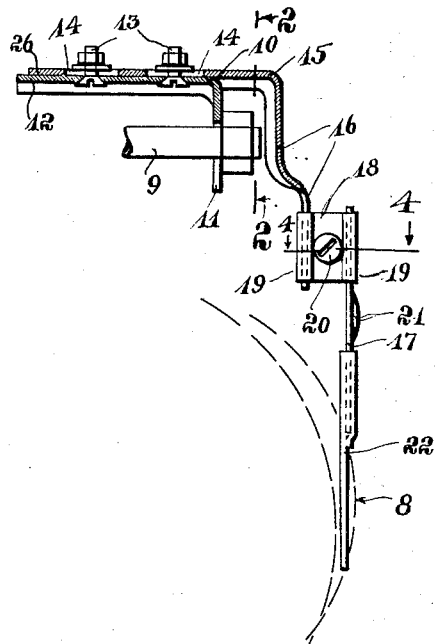
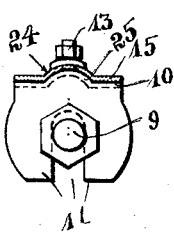
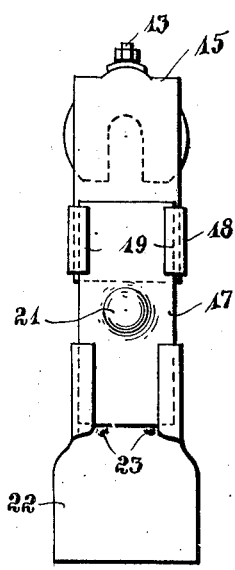
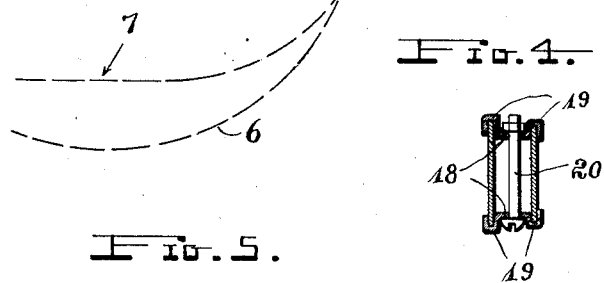
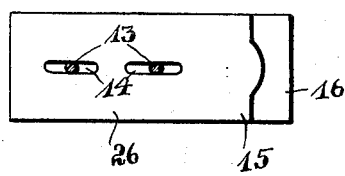
INVENTOR.
CONRAD LANGHAM,
By: Otto H. Ringer,
his Atty Patented Nov. 9, 1926.

1,606,584

UNITED STATES PATENT OFFICE.

CONRAD LANGHAM, OF LOS ANGELES, CALIFORNIA.

TIRE SIGNAL.

Application filed March 3, 1926. Serial No. 91,959.

This invention relates to devices applied to pneumatic tires of vehicles, to indicate deflating of the tires.

One of the objects of this invention is to provide a simple device that can be applied to the bolts of rim-lug wedges.

Another object is to provide means for lateral adjustments, whereby the contact member of the device can be moved to more or less spaced relation to the tire.

Another object is to provide a spring with a dent whereby a distinct sound is made upon spreading of a deflated tire.

Other objects will appear from the following description and claims as well as from the accompanying drawing, in which—

Fig. 1 is an end elevation, partly in section to show interconnecting parts, illustrating the device as applied transversely to a tire.

Fig. 2 is a section on line 2—2 of Fig. 1, illustrating the reinforced cross-section of the principal supporting members, and illustrating the application of the device to the bolt of a rim-lug wedge.

Fig. 3 is a side elevation of the device of Fig. 1.

Fig. 4 is a cross section on line 4—4 of Fig. 1.

Fig. 5 is a top plan view of the shiftable supporting arm, showing the slots by which a lateral adjustment is made possible.

A properly inflated tire is generally of rather round form in its cross section as indicated by the dotted circle at 6 in Fig. 1, while a deflated tire may become flat at the bottom as indicated at 7, so as to cause the sides of the tire to bulge out as indicated at 8.

It is obvious that, if a suitable device is applied to a tire at this point, this bulging-out may be used to operate a signal or alarm.

On the other hand, it must be taken into consideration that even an inflated tire has the tendency to bulge out slightly; and, furthermore, allowance must also be made that different vehicles are treated differently, and that different owners of vehicles may prefer to have their tire more or less inflated.

To take care of such variations, various means for adjustments are embodied in this invention.

In Fig. 1, the end of a bolt is indicated at 9, by which a rim-lug wedge may be held in position on a wheel.

The bracket 10 is provided with a bifurcated end 11, to be inserted between the bolt 9 and a wheel felly, and another portion 12 by which other parts of the device may be adjustably held on the felly or rim of the wheel. As illustrated, bolts 13 are provided in the portion 12 of the bracket, to extend through the slots 14 in the adjustable bracket 15, so that the second bracket 15 may be adjusted laterally in relation to the wheel and to the comparatively stationary bracket 10.

The brackets may, of course, be applied to the inside or outside of a wheel, though it is preferable to apply this device to the inside in order that the device may not be damaged unnecessarily, as when a vehicle is driven close to a curbing so that the outside of the wheel may touch the curbing. The adjustable bracket is provided with a bent portion 16 to the end of which the spring 17 is applied. Clamping members 18 are used to secure the spring member 17 to the adjustable bracket 15. The clamping members are crimped along opposite edges, to clinch over the edges of the bracket-end 16 and spring 17, as indicated at 19 in Fig. 4. The bolt 20 serves to hold the oppositely disposed clamping members together.

The spring 17 is provided with a dent 21, to hold the spring under tension in a certain direction, which tends also to produce a certain sound when the spring is bent against the tension beyond certain limits. This indentation is preferably disposed and maintained at a point at which the spring will be normally bent when the device is applied to a tire as described above.

Since the spring is naturally of rather hard material that might damage a tire when applied in this manner to contact with the sides of the tire, a contact member 22 is clinched to the lower end of the spring. This contact member is preferably rounded along its edges, so as to avoid a scratching or damaging of tires. Indentations at 23 or other suitable points serve to hold the contact member in place on the spring end.

The adjustable bracket is provided with an elongated indentation or bead-like reinforcement 24 to engage and align with a corresponding reinforcement or bead in the stationary bracket, indicated at 25, in Fig. 2.

Though the bolts 13 are shown on the portion 12 of the bracket 10, it must be understood that these bolts may be applied directly to a felly so that the member 15, and more particularly the upper portion 26 of this member 15, may be moved for lateral adjustments over the bolts 13 when so disposed directly on the felly in a similar manner as if on the bracket portion 12.

The portion 16 is illustrated comparatively long as it will be with larger tires, but may be just as well shorter so that the clamping members 18 will appear close to the upper portion 26 of the member 15. In fact, considering the direct application of the bolts 13 to a felly, referred to above, the member 15 may as well be considered and used as the bracket in certain cases depending on the type of vehicle and wheels.

Having thus described my invention, I claim:—

1. In a tire signal, a bracket having a bifurcated end to be inserted between a bolt of a rim lug wedge and a wheel, a contact member disposed to contact with the side of a pneumatic tire, and adjusting means by which the contact member is operatively held and supported on the said bracket, the adjusting means having interengaging means with the said bracket for lateral adjustment in relation to the wheel.

2. In a tire signal, a bracket having a supporting end to be attached to a wheel rim and having a portion extending inwardly over the wheel rim practically parallel to the axis of the wheel, a contact member to extend over the side of a pneumatic tire on the wheel, a spring member for carrying the contact member, and connecting members to secure the spring to the bracket and embodying means for adjustments in axial relation to the wheel.

In testimony that I claim the foregoing as my invention I have signed my name.

CONRAD LANGHAM.